Figure 1:
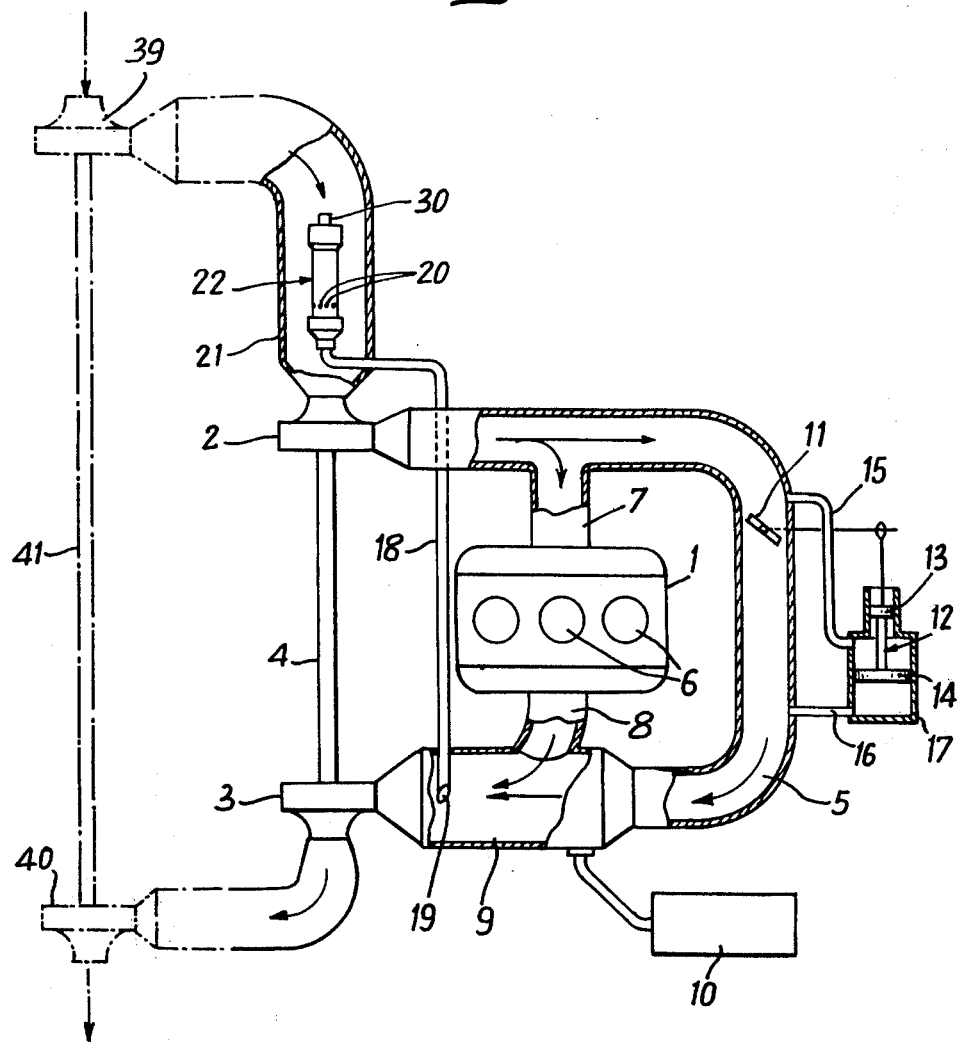

United States Patent [19]

Melchior

[11] 4,009,574

[45] Mar. 1, 1977

[54] COMPRESSION-IGNITION INTERNAL COMBUSTION ENGINES

[75] Inventor: Jean F. Melchior, Paris, France

[73] Assignee: The French State, Paris, France

[22] Filed: July 25, 1975

[21] Appl. No.: 599,140

[30] Foreign Application Priority Data

Aug. 1, 1974 France .............. 74.26703

[52] U.S. Cl. ................... 60/606; 60/599; 60/605; 60/617; 60/619

[51] Int. Cl.² ........................ F02B 33/44

[58] Field of Search ........... 60/599, 605, 606, 607, 60/611, 617, 619, 615, 614

[56] References Cited

UNITED STATES PATENTS

| 2,633,698 | 4/1953 | Nettel ........................ 60/606 |
| 3,163,984 | 1/1965 | Dumont ...................... 60/606 |

FOREIGN PATENTS OR APPLICATIONS

| 1,406,599 | 6/1964 | France ........................ 60/606 |

Primary Examiner—Ronald H. Lazarus
Attorney, Agent, or Firm—Barnes, Kisselle, Raisch & Choate

[57] ABSTRACT

A power plant comprises a compression ignition internal combustion engine supercharged by a turbo-compressor set the turbine of which is supplied in parallel through the exhaust duct of the engine and through a by-pass passage starting from the compressor and provided with an auxiliary combustion chamber. The power plant comprises also a recycling duct one end of which is located between the downstream end of the auxiliary combustion chamber and the turbine inlet and the other end of which is disposed in the compressor intake duct. The recycling duct is closed once the compressor can, without recycling, produce upstream of the engine conditions for spontaneous ignition.

10 Claims, 2 Drawing Figures

COMPRESSION-IGNITION INTERNAL COMBUSTION ENGINES

This invention relates to a power plant.

In particular, the invention concerns a power plant of the kind comprising: a compression ignition internal combustion engine; a turbo-compressor set for supercharging the engine and comprising a compressor having an intake duct, a turbine driving the compressor and a passage communicating, preferably continuously, with the compressor outlet and the turbine inlet, the engine comprising a variable-volume working chamber so communicating via an inlet duct with the compressor outlet and via an exhaust duct with the turbine inlet as to be in parallel with at least some of the passage; an auxiliary combustion chamber supplied with fresh air through the passage, with fuel by a fuel supply system, and with combustion gases by the exhaust duct and delivering hot gases to the turbine to help drive the same; and a recycling duct extending from a zone of the gas circuit which is downstream of the auxiliary combustion chamber to a zone of such circuit which is upstream of the engine working chamber.

The term "internal combustion engine comprising a variable-volume working chamber" is intended to denote any engine having at least one working chamber in which the inlet, compression, combustion and expansion, and exhaust phases occur on either the four-stroke or two-stroke principle. The concept applies broadly to engines in which the or each working chamber is bounded by a reciprocating or rotating (as in Wankel or other kinds of engine) piston moving relative to a cylinder or envelope, as opposed to internal combustion engine, such as gas turbines, which have a fixed-volume working chamber.

As the foregoing shows, the term "internal combustion engine comprising a working chamber" covers engines having a single working chamber and — the commoner case — engines having a number of working chambers. Also, a statement to the effect e.g. that the turbo-compressor set comprises a compressor and a turbine and that the power plant comprises an auxiliary combustion chamber means that the turbo-compressor set comprises at least one compressor and at least one turbine and the power plant comprises at least one auxiliary combustion chamber, the terminology having been chosen to simplify the description of the invention.

Power plants of the kind hereinbefore defined have been disclosed in various patents filed in the name of the Applicant, including British Pat. application No. 15992/73 and French Pat. application No. 73 10041 of 21st Mar. 1973.

The starting and slow-running of the engine of such a power plant are of course conditions associated with problems which become proportionately more difficult to solve as the ambient temperature becomes lower. The problems become even more difficult in the case of low-compression engines, e.g., engines having a compression ratio of less than 12 : 1. The main reason for the extra difficulty is the excessive prolongation of the time taken to ignite the air-fuel mixture in the cylinder or working chamber at the end of the compression stroke; the time taken for ignition depends mainly upon the temperature and, to a lesser extent, upon the pressure of the mixture.

Various suggestions have been made to obviate these problems, including the use of a recycling duct to return to the engine hot gases consisting of some of the engine exhaust gases and of combustion gases produced in the auxiliary combustion chamber. According to a first suggestion, hot gas recirculation is provided inter alia from the upstream side of the turbine to the downstream side of the compressor; according to a second solution, the recirculation is provided from the downstream side of the turbine to the upstream side of the compressor (see U.S. Pat. Specification No. 2 633 698, FIG. 4).

For there to be a recirculation effect, pressure in the exhaust duct must, according to the first suggestion, be greater than the pressure in the inlet duct. Accordingly, U.S. Pat. Specification No. 2 633 698 suggests the provision of a choke valve 35 in the engine intake duct upstream of the place where the recycling duct 26 joins the intake duct, such choke valve being adapted to produce a pressure drop between the compressor outlet and the engine intake duct. Clearly, a valve of this kind makes it necessary to alter the aerodynamic structure between the compressor and the engine and calls for costly and bulky actuating means. Also, the presence of such a valve makes it impossible to have scavenging of the engine, so that the system cannot be used for two-stroke engines.

The second solution calls for a wide and bulky recycling duct 28, since the recycled gases are at a reduced pressure which is at most equal to the turbine outlet pressure. Also, the recycled gas delivery rate depends inter alia upon the pressure at the compressor inlet — i.e., upon a parameter which the engine designer is totally unable to assess since it depends upon pressure losses which in turn depend upon the length and geometry of the inlet duct or chimney connected to the inlet of the compressor.

It is an object of the invention to improve starting and slow-running and low-power performance of a power plant of the kind hereinbefore described, more particularly a power plant having a low compression ratio engine, whilst obviating the aforesaid disadvantages of the prior art.

According to the invention, in a power plant of the kind defined hereinbefore, one end of the recycling duct is located between the downstream zone of the auxiliary combustion chamber and the turbine inlet, and the other end of such recycling duct is disposed in the compressor intake duct, the recycling duct having actuating means adapted to close such duct once the compressor can, without recycling, produce upstream of the engine thermodynamic conditions for spontaneous ignition.

The term "downstream zone" of the auxiliary combustion chamber denotes in this context the zone where the fuel taken into such chamber has already been burned substantially completely and the resulting gases have been diluted with fresh air and/or engine exhaust gases, such zone usually being disposed downstream of the place where such exhaust gases arrive.

Of course, since the pressure in the auxiliary combustion chamber is always higher than the pressure in the compressor intake duct (even when a low-pressure compressor is connected to the latter duct), the recycling duct, unless closed by its actuating or control means, returns to the intake side of the compressor some of the hot gases derived upstream of the turbine, and so there is no need to provide a restricting or choking valve producing pressure losses or drops. There is a sufficient quantity of such hot gases to heat, by mixing, the air taken in by the compressor and to produce at the engine inlet thermodynamic conditions suitable for producing spontaneous ignition at the end of compression. The invention therefore improves cold starting, slow-running and low-power operation.

Also, since the pressure difference between the inlet and the outlet of the recycling duct is relatively high, the cross-section of such duct can be relatively narrow and it is possible to produce, by lamination at the duct exit, streams which preferably extend transversely to the main fresh air flow and which help to produce homogeneous mixing of such gases with the fresh air.

Operation of the installation is also independent of the length and geometry of the intake chimney of the compressor and is therefore always close to design studies and development. Modifying the recycling duct is a very simple job and calls for no constructional modification of the aerodynamic turbo-compressor /engine circuit; the recycling duct can be an optional fitting, for severe atmospheric conditions, on an engine which already has its own starting and low-power operation facilities, as a means of improving starting and slow-running in severe atmospheric conditions.

The recycled gases extracted at the auxiliary combustion chamber exit from clean gases (complete combustion of a lean mixture) cannot soil the compressor and the circuit which connects the same to the engine.

To give some idea, if it is required to maintain the compressor intake temperature at 40° C (assuming a compression ratio of 1.7) for ambient temperature variations between +40° C and −40° C, the rate of gas flow to be recycled will vary from 0 to 10% of the total rate of flow of the combustion gases delivered by the auxiliary combustion chamber. In the case of a power plant having a compressor which can deliver 1 kg/sec of air at a 5 : 1 compression ratio, a recycling duct having a diameter as small as 30mm is sufficient to provide the maximum 10% recycling.

Preferably, the actuating means of the recycling duct are automatic and responsive to the difference between the pressure upstream of the turbine and the pressure upstream of the compressor and are adapted to open or close such duct according to whether such difference is below or above a predetermined threshold value (on/-off operation). The reason for this is that the thermodynamic conditions hereinbefore defined for a given compressor are reached or exceeded above a critical compression ratio.

Conveniently, the actuaing means of the recycling duct are responsive to the air temperature upstream of the compressor, so that when such means open the recycling duct they present to the recycled gases a flow cross-section which decreases progressively as such temperature increases and vice versa.

Advantageously, the actuating means of the recycling duct are disposed in the compressor intake duct and comprise: a stationary tubular member forming the downstream end of the duct and comprising consecutively, in the recycled gas flow direction, an internal valve seat, recycling gas outlet orifices, and a communicating passage between the inside and the outside of the stationary tubular member; and a piston moving in that zone of the tubular member which is between the outlet orifices and the communicating passage, the piston having at its upstream end a valve co-operating with the said seat, the piston being biased by resilient means which tend to disengage the valve from its seat by moving the valve in the opposite direction to the recycled gas flow direction until the valve is stopped by an abutment.

Preferably, that part of the tubular member which is formed with the recycled gas outlet orifices is disposed on the axis of a straight portion of the intake duct, and the said orifices are distributed around the periphery of such part of the tubular member and are disposed substantially at right-angles to the said axis. So that the actuating or control means may be responsive to the temperature of the air entering the compressor, the recycled gas outlet orifices are staggered in the direction of piston movement, and the tubular member has temperature-sensitive means adapted to increasingly displace the abutment against the recycled gas flow direction in proportion as the temperature increases, so that the piston closes an increasing number of the recycled gas outlet orifices and thus decreases the rate of flow of such gases, subject to the piston resting on its abutment and to the valve therefore being open.

Figure 2:
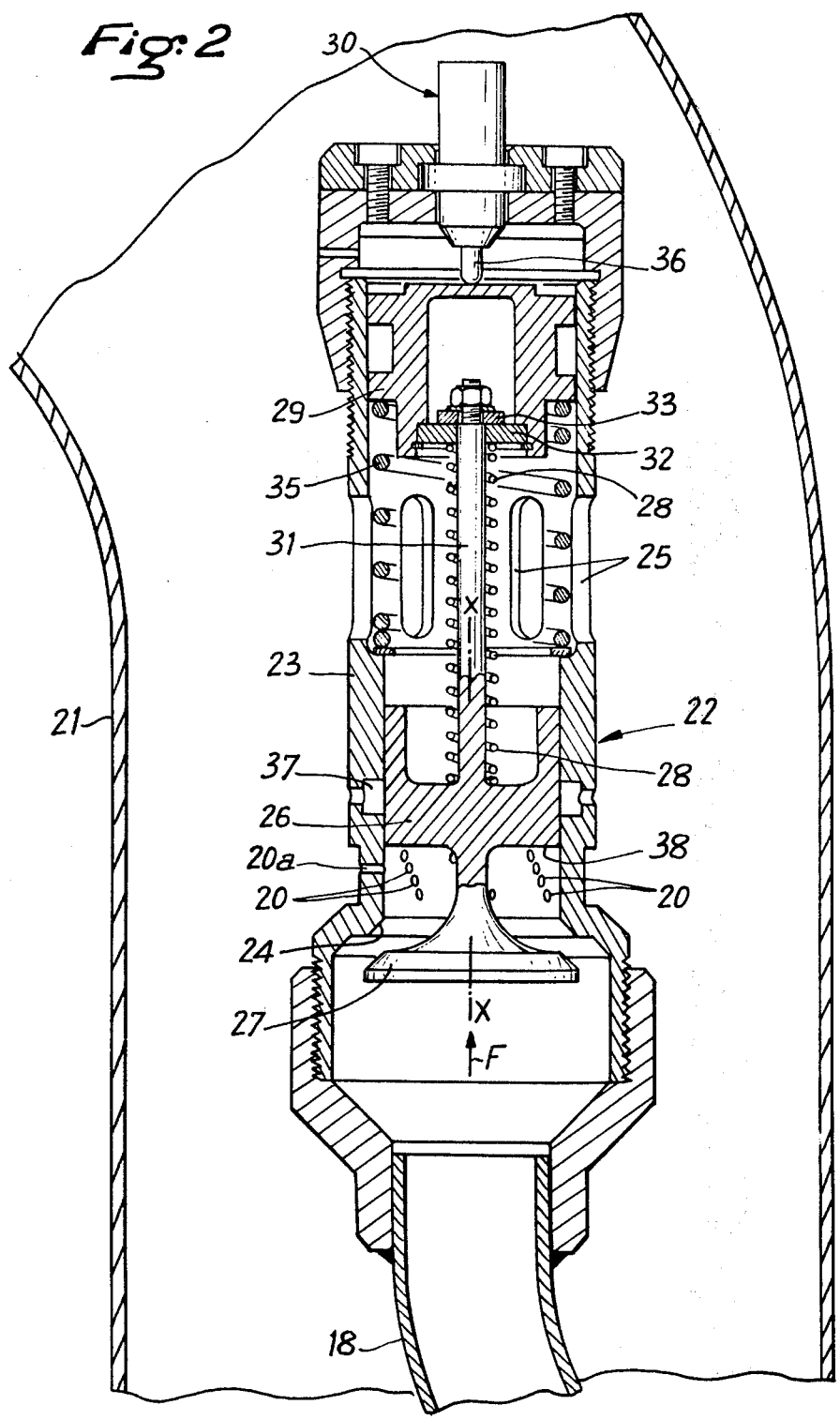

In order that the invention may be readily understood, an embodiment thereof will now be described, by way of example, with reference to the accompanying drawings, in which:

FIG. 1 is a diagrammatic view, partly in plan and partly sectioned, of a supercharged diesel engine power plant embodying the invention; and FIG. 2 is a view, on an enlarged scale and in axial section, of a detail of the power plant of FIG. 1.

Referring to FIG. 1, a diesel engine 1 is supercharged by a turbo-compressor set comprising a compressor 2, a turbine 3 driving the compressor 2 by way of a shaft 4, and a passage 5 which communicates, preferably continuously, with the delivery side of the compressor 2 and with the inlet of the turbine 3. Arrows in FIG. 1 denote the directions in which the air and other gas mixtures flow.

Engine 1 has a number of variable-volume working chambers 6 communicating by way of an inlet duct or manifold 7 with the delivery side of compressor 2, as a rule via the upstream end of passage 5, and communicating via an exhaust duct or manifold 8 with the downstream end of passage 5, so that the working chambers 6 are connected in parallel with a portion of passage 5.

The power plant also comprises an auxiliary combustion chamber 9 supplied with fresh air through passage 5, of which chamber 9 forms at least some of the downstream end, with fuel by a fuel supply system 10 and with combustion gases by the exhaust duct 8 which extends into chamber 9. The chamber 9 therefore delivers hot gases to turbine 3 to help drive the turbine.

The power plant also comprises, in that part of passage 5 which is positioned between the beginning of inlet duct 7 and the auxiliary combustion chamber 9, restricting or choking means adapted to produce, between the air issuing from compressor 2 and the gases entering turbine 3, a pressure drop which is substantially independent of the ratio between the rate of air flow through passage 5 and the total rate of air flow delivered by compressor 2 but which varies in the same sense as the pressure in duct 7 upstream of the restricting means. The restricing means can be a rotatable flap or the like 11 (as shown in FIG. 1) or a sliding or rotating plug or a similar device and are actuated by a differential plunger 12 having two pistons 13, 14 which differ in cross-section from one another and between which a duct 15 is provided so that the pressure in passage 5 upstream of the restricting means 11 is present between the pistons 13 and 14. The other surface of the smaller piston 13 experiences atmospheric pressure and the other surface of the larger piston 14 experiences the pressure which exists in the passage 5 downstream of the restricting means 11 and which is transmitted through a duct 16. Plunger 12 is movable in a differential cylinder 17. The system embodied by the cylinder 17, plunger 12, restricting means 11 and the mechanism connecting the restricting means to plunger 12 is such that the required pressure drop pattern past the restricting means is produced.

The fuel supply system 10 is under the control of means which adapt its delivery to suit the operating conditions of the power plant; the latter means are not directly involved in the invention and since they have already been described in various of the Applicants' patent specifications, they will not be described in detail herein. Also, the auxiliary combustion chamber 9 is usually divided, upstream to downstream, into a primary combustion zone supplied with fresh air and with fuel and into a secondary dilution zone which is supplied with fresh air and with exhaust gases and which is connected to turbine 3; for the reason just given no further details will be given here of the construction of chamber 9.

In accordance with the invention, the plant comprises a hot gas recycling duct 18 having one end 19 located somewhere between the downstream zone of the auxiliary combustion chamber 9 and the inlet of the turbine 3 and having its other end provided with outlet orifices 20, in an intake duct or chimney 21 of compressor 2. The recycling duct 18 also has automatic actuating means 22 which are adapted to close the duct 18 once the compressor 2 can, without recycling, produce upstream of engine 1 the thermodynamic conditions required for spontaneous ignition.

A description has been given in the foregoing of the term "downstream zone" of the auxiliary combustion chamber 9. As a further particular, such zone corresponds approximately to the end of the secondary dilution zone.

As can be seen in detail in FIG. 2, the actuating means 22 are disposed in compressor intake duct 21 and comprise a stationary tubular member or casing 23 which forms the downstream end of duct 18 and which comprises consecutively, in the recycled gas flow direction (diagrammatically indicated by an arrow F), an internal valve seat 24, the outlet orifice 20 and a communicating passage, in the form of orifices 25, between the inside and outside of casing 23. The means 22 also comprise a piston 26 moving in that zone of the casing 23 which is between the orifices 20 and the orifices 25, piston 26 having at its upstream end a valve 27 cooperating with the seat 24. Piston 26 is biased by a calibrated spring 28 which tends to disengage valve 27 from its seat 24 by moving it in the direction opposite to the direction indicated by the arrow F until piston 26 is stopped by an abutment 29 which also serves as a member on which the spring 28 bears.

That part of the casing 23 which is formed with the orifices 20 is disposed on the axis X—X of a straight part of the intake duct 21, and the orifices 20 are distributed around the periphery of such straight part and extend substantially at right-angles to the axis X—X, as is shown in FIG. 2 for that of the orifices which has the reference 20a and which is disposed in the plane of the drawing.

The orifices 20 are staggered in the direction of movement of the piston 26, and the casing 23 has means 30 which are responsive to the temperature of the air arriving through duct 21 and which, as the temperature rises, can move abutment 29 against the direction of the arrow F to an extent which is proportional to the increasing temperature, so that the piston 26 closes an increasing number of orifices 20 and therefore reduces the rate of flow or recycled gases, subject to the piston being in engagement with its abutment 29 — i.e., to the valve 27 being disengaged from its seat 24.

The piston 26 has, at the end thereof remote from the valve 27, an axial rod 31 which extends freely through a disc 32 rigidly secured to the abutment 29 and which bears on the back of disc 32 by way of a transverse projection rigidly secured to rod 31 and embodied e.g. by a disc or washer or the like 33. Abutment 29 is embodied by a cylindrical member sliding in casing 23 under the opposing actions of a spring 35 (moving it in the direction of arrow F) and of a tappet or the like 36 which projects from the means 30 an amount which increases in proportion as the temperature assessed thereby rises. The disc 32 can serve as a member for the spring 28 to bear on.

Between the orifices 20 and the orifices 25 the casing 23 is formed with a discharge groove 37 so disposed as to provide communication between the intake duct 21 and the space between valve 27 and a control edge 38 of the piston 26 when valve 27 is in engagement with its seat 24. The groove 37 prevents the hot gases arriving through the recycling duct 18 from reaching and damaging the springs 28, 35.

The power plant described above operates as follows:

The turbo-compressor set 2, 3 is started by starting means (not shown) and fuel is introduced by the system 10 into the auxiliary combustion chamber 9 in sufficient quantity for independent operation of the turbo-compressor set 2, 3. Since the pressure of the hot gases in the downstream zone of chamber 9, which pressure acts through duct 18 on piston 26, is too low to overcome the force of spring 28 but is always higher than the intake pressure of the fresh air taken in by the compressor through intake duct 21, some of the hot gases produced in chamber 9 are recycled through duct 18 and orifices 20 into duct 21 where the latter gases mix with and heat the fresh air. Engine 1 can then be started by means of a starter (not shown) since the thermodynamic conditions thus produced are sufficient for spontaneous ignition to be possible in the engine working chambers 6.

The hot recycled gases issuing at high speed from the orifices 20 transversely of the flow of fresh air flowing in duct 21 combine with the fresh air to form a mixture which is homogeneous in composition and more particularly in temperature.

The lower the outside air temperature, the more the tappet 36 enables the spring 35 to raise the abutment 29 and therefore the valve 27, thus increasing the number of orifices 20 which are open. In fact, the rate of flow of recycled hot gases increases in proportion as the outside temperature decreases — i.e., in proportion as more heating is necessary.

While the pressure of the hot recycled gases remains below a threshold value after which the thermodynamic conditions permit spontaneous ignition, the spring 28 moves the piston 26 in the opposite direction to the arrow F as far as permitted by the members 32 and 33 contacting one another. Because of the flared shape of the seat 24 and valve 27, the hot gases flowing around the valve 27 are not laminated. When the pressure of the recycled gases reaches the threshold value just mentioned, the piston 26 rises, so that the hot gases flowing around the valve 27 are laminated and there is therefore a pressure drop downstream of valve 27; the same therefore engages rapidly with its seat 24. The valve 27 thus has an on/off action. Consequently, at high power it is completely impossible for there to be recycling of the hot gases likely to damage the compressor 2.

Heating the air at the compressor intake causes an increased fuel consumption varying in the foregoing example from 0 to 21%. However, if spontaneous ignition conditions were to be maintained just by increasing the pressure of the turbo-compressor set 2, 3, the increase in fuel consumption would be even greater, and so it may be claimed that the invention provides a relative fuel economy. Also, increasing the pressure of the turbo-compressor would call for an over-dimensioned engine starter and hence increase the capital cost of the plant.

Clearly, the invention is not limited to the embodiment shown. For instance, and as shown in chain-dotted lines in FIG. 1, the plant could comprise a low-pressure compressor 39 upstream of the compressor intake duct 21 and a low-pressure turbine 40 downstream of the turbine 3, the turbine 40 driving the compressor 39 by way of a shaft 41. Another possibility is that the actuating means 22, if automatic, can be sensitive to other parameters such as the engine coolant temperature. Of course, the actuating means 22 need not necessarily be automatic and can be operator-controlled.

What I claim is:

1. A power plant comprising: a compression ignition internal combustion engine; a turbo-compressor set for supercharging the engine, and comprising a compressor having an intake duct, a turbine driving the compressor and a passage communicating with the compressor outlet and the turbine inlet, the engine comprising a variable-volume working chamber so communicating via an inlet duct with the compressor outlet and via an exhaust duct with the turbine inlet as to be in parallel with at least some of the passage; an auxiliary combustion chamber supplied with fresh air through the passage, with fuel by a fuel supply system, and with combustion gases by the exhaust duct and delivering hot gases to the turbine to help drive the same; and a recycling duct one end of which is located between the downstream zone of the auxiliary combustion chamber and the turbine inlet, and the other end of which is disposed in the compressor intake duct, the recycling duct having actuating means adapted to close such duct once the compressor can, without recycling, produce upstream of the engine thermodynamic conditions for spontaneous ignition.

2. A power plant according to claim 1, in which the actuating means of the recycling duct are automatic and responsive to the difference between the pressure upstream of the turbine and the pressure upstream of the compressor and are adapted to open or close the duct according to whether such difference is below or above a predetermined threshold value.

3. A power plant according to claim 2, in which the actuating means of the recycling duct are responsive to the air temperature upstream of the compressor, so that when such means open the recycling duct they present to the recycle gases a flow cross-section with decreases progressively as such temperature increases and vice versa.

4. A power plant according to claim 2, in which the actuating means of the recycling duct are disposed in the compressor intake duct and comprise: a stationary tubular member forming the downstream end of the duct and comprising consecutively, in the recycled gas flow direction, an internal valve seat, recycling gas outlet orifices, and a communicating passage between the inside and the outside of the stationary tubular member; and a piston moving in that zone of the tubular member which is between the outlet orifices and the communicating passage, the piston having at its upstream end a valve co-operating with the said seat, the piston being biased by resilient means which tend to disengage the valve from its seat by moving the valve in the opposite direction to the recycled gas flow direction until the valve is stopped by an abutment.

5. A power plant according to claim 4, in which the recycled gas outlet orifices are staggered in the direction of piston movement, and the tubular member has temperature-sensitive means adapted to increasingly displace the abutment against the recycled gas flow direction in proportion as the temperature increases so that the piston closes an increasing number of the recycled gas outlet orifices and thus decreases the rate of flow of such gases, subject to the piston resting on its abutment and to the valve therefore being open.

6. A power plant according to claim 4, in which that part of the tubular member which is formed with the recycled gas outlet orifices is disposed on the axis of a straight portion of the intake duct, and the said orifices are distributed arched the periphery of such part of the tubular member and are disposed substantially at right-angles to the said axis.

7. A power plant according to claim 6, in which the recycled gas outlet orifices are staggered in the direction of piston movement, and the tubular member has temperature-sensitive means adapted to increasingly displace the abutment against the recycled gas flow direction in proportion as the temperature increases so that the piston closes an increasing number of the recycled gas outlet orifices and thus decreases the rate of flow of such gases, subject to the piston resting on its abutment and to the valve therefore being open.

8. A power plant according to claim 6, in which the tubular member is formed with a discharge groove so disposed that the piston opens the said groove by way of a control edge of the piston which co-operates with the outlet orifices when the valve engages its seat.

9. A power plant comprising: a compression ignition internal combustion engine; a turbo-compressor set for supercharging the engine and comprising a compressor having an intake duct, a turbine driving the compressor and a passage communicating with the compressor outlet and the turbine inlet, the engine comprising a variable-volume working chamber so communicating via an inlet duct with the compressor outlet and via an exhaust duct with the turbine inlet as to be in parallel with at least some of the passage; an auxiliary combustion chamber supplied with fresh air through the passage, with fuel by a fuel supply system, and with combustion gases by the exhaust duct and delivering hot gases to the turbine to help drive the same; and a recycling duct one end of which is located between the downstream zone of the auxiliary combustion chamber and the turbine inlet, and the other end of which is disposed in the compressor intake duct, the recycling duct having actuating means adapted to close such duct once the compressor can, without recycling, produce upstream of the engine thermodynamic conditions for spontaneous ignition; which actuating means of the recycling duct are automatic and responsive to the difference between the pressure upstream of the turbine and the pressure upstream of the compressor, are adapted to open or close the duct according to whether such difference is below or above a predetermined threshold value, are disposed in the compressor intake duct and comprise: a stationary tubular member forming the downstream end of the duct and comprising consecutively, in the recycled gas flow direction, an internal valve seat, recycling gas outlet orifices, and a communicating passage between the inside and the outside of the stationary tubular member; and a piston moving in that zone of the tubular member which is between the outlet orifices and the communicating passage, the piston having at its upstream end a valve co-operating with the said seat, the piston being biased by resilient means which tend to disengage the valve from its seat by moving the valve in the opposite direction to the recycled gas flow direction until the valve is stopped by an abutment; said actuating means of the recycling duct being responsive to the air temperature upstream of the compressor, so that when such means open the recycling duct they present to the recycled gases a flow cross-section which decreases progressively as such temperature increases and vice versa.

10. A power plant according to claim 9, in which the tubular member is formed with a discharge groove so disposed that the piston opens the said groove by way of a control edge of the piston which co-operates with the outlet orifices when the valve engages its seat.

* * * * *

UNITED STATES PATENT OFFICE
CERTIFICATE OF CORRECTION

PATENT NO. : 4,009,574
DATED : March 1, 1977
INVENTOR(S) : Jean F. Melchior

It is certified that error appears in the above-identified patent and that said Letters Patent are hereby corrected as shown below:

Column 1, line 36 - "engine" should be --engines--

Column 5, line 17 - "Applicants" should be --Applicant's--

Column 7, line 68 - "with" should be --which--

Column 1, line 55 - After "1973" and before the period (.), insert: --(and the corresponding U.S. Patent 3,988,894, issued November 2, 1976)--

UNITED STATES PATENT OFFICE
CERTIFICATE OF CORRECTION

PATENT NO. : 4,009,574
DATED : March 1, 1977
INVENTOR(S) : Jean F. Melchior

It is certified that error appears in the above-identified patent and that said Letters Patent are hereby corrected as shown below:

Column 6, line 9 - "or" should be --of--

Column 8, line 33 - "arched" should be --around--

Signed and Sealed this

Twenty-second Day of November 1977

[SEAL]

Attest:

RUTH C. MASON
Attesting Officer

LUTRELLE F. PARKER
Acting Commissioner of Patents and Trademarks